US006182069B1

(12) United States Patent
Niblack et al.

(10) Patent No.: US 6,182,069 B1
(45) Date of Patent: *Jan. 30, 2001

(54) VIDEO QUERY SYSTEM AND METHOD

(75) Inventors: Carlton Wayne Niblack, San Jose; Dragutin Petkovic, Saratoga, both of CA (US)

(73) Assignee: International Business Machines Corporation, Armonk, NY (US)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/002,340

(22) Filed: Jan. 2, 1998

Related U.S. Application Data

(63) Continuation-in-part of application No. 08/788,150, filed on Jan. 24, 1997, which is a continuation of application No. 08/720,993, filed on Oct. 15, 1996, which is a continuation of application No. 08/216,986, filed on Mar. 23, 1994, now Pat. No. 5,579,871, which is a continuation-in-part of application No. 07/973,474, filed on Nov. 9, 1992.

(51) Int. Cl.[7] ................................................. G06F 17/30
(52) U.S. Cl. ................................. 707/6; 382/260; 707/104
(58) Field of Search ...................... 707/1–10, 100–104, 707/200–206, 501, 516; 701/200; 706/45, 46, 50, 53, 55, 59, 61; 364/474.24, 474.07; 379/202; 386/96, 97

(56) References Cited

U.S. PATENT DOCUMENTS

| | | | |
|---|---|---|---|
| 5,579,471 | 11/1996 | Barber et al. | 395/326 |
| 5,664,227 * | 9/1997 | Mauldin et al. | 707/516 |
| 5,802,361 * | 9/1998 | Wang et al. | 379/202 |
| 5,819,288 * | 10/1998 | Bonet | 707/104 |
| 5,835,667 * | 11/1998 | Wactlar et al. | 386/96 |
| 5,852,823 * | 12/1998 | Bonet | 707/6 |
| 5,867,605 * | 2/1999 | Oliveras et al. | 382/260 |
| 5,870,768 * | 2/1999 | Hekmatpour | 707/501 |
| 5,875,446 * | 2/1999 | Brown et al. | 707/3 |
| 5,893,095 * | 4/1999 | Jain et al. | 707/6 |

OTHER PUBLICATIONS

"Query by Image And Video Content: The QBIC System", M. Flickener, Computer Sep. 1995, pp/ 23–32.

"A Method Of Defining The Similarity of images On The Basis Of Color Information", M. Ioka, Bulletin of the National Museum of Ethnology Special Issue, pp. 229–244, No. 17, Nov. 1992, from National Museum of Ethnology, Osaka, Japan.

"Model–based 2D & 3D Dominant Motion Estimation For Mosaicing And Video Representation", H. Sawhney, Jan. 1995, published online at ftp//eagle.almaden.ibm.com.

"Automatic Video Database Indexing and Retrevial", E. Ardizzone, et al, Multimedia Tools and Applications 4, pp. 29–56, (1997).

"Visual Information Retrivial Technology A VIRAGE Perspective" (Revision 2), A. Gupta, A VIRAGE Perspective, pp. 1–10, Aug. 18, 1995.

"Image Recognition Meets Content Management For Authoring, Editing & More", C. Okon, Advanded Imaging, pp. 60–62.

(List continued on next page.)

Primary Examiner—Ruay Lian Ho
(74) Attorney, Agent, or Firm—McGinn & Gibb, P.C.; Khanh O. Tran, Esq.

(57) ABSTRACT

Search of video images in a database is enhanced by specification of at least one object and a background in stored frames and in queries of the database. Video information is stored in the database by means of representative frames that include at least one object and a background. A query of the database is executed by determining whether a representative frame in the database having at least one object and a background is similar to a search image having at least one object and a background.

15 Claims, 15 Drawing Sheets

OTHER PUBLICATIONS

"Video Indexing Using Optical Flow Field", E. Ardizzone & M. Lā Cascia, International Conference On Image Processing, vol. III of III, pp. 931–834, Sep. 16–19, 1996.

"Searching Images Using Ultimedia Manager", H. Treat et al, IBM Santa Teresa Lab.

"A. Method For Retrieving Sequences Of Images on The Basis of Motion Analysis", M. Ioka & Kurokawa, SPIE vol. 1662 Image Storage And Retrieval Systems (1992), pp. 35–46.

"Ultimedia Manager 1.1 and Client Search", Hot Picks brochure.

"QuickTime VR—An Overview of Apple's QuickTime VR Technology", Apple Computer, Inc., 1995.

"Panoramic Overviews For Navigating Real–World Scenes", L. Teodosio& M. Mills, pp. 359–364.

"Salient Video Stills: Content and Context Preserved", L. Teodosio & W. Bender, ACM Multimedia 93, Aug. 1–6, 1993, pp. 39–46.

"VideoMAP and VideoSpaceIcon: Tools For Anatomizing Video Content" Y. Tonomura, A. Akutsu, K. Otsuji & T. Sadakata, INTERCHI '93, Apr. 24–29, 1993, pp. 131–136.

"Automatic, Object–Based Indexing for Assisted Analysis Of Video Data", J. Courtney, Proceedings ACM Multimedia 96, Nov. 18–22, 1996, pp. 423–424.

"Image Segmentation", http://ciips.ee.uwa.edu.au/~williams/research/complete1995/.

"Image Segmentation Workshop 1996", The Australian Pattern Recognition Society , http://www.dms.csiro.au/~edb/Segment96/.

* cited by examiner

| THUMBNAIL (COLOR) | AVG RED | AVG GREEN | AVG BLUE |
|---|---|---|---|
| M | $R_m$ | $G_m$ | $B_m$ |
| ⋮ | | | |

60

| THUMBNAIL (TEXTURE) | COARSENESS | CONTRAST | DIRECTIONALITY |
|---|---|---|---|
| P (smooth) | $C_p$ | $CN_p$ | $I_p$ |
| ⋮ | | | |

62

| THUMBNAIL (SIZE) | SIZE |
|---|---|
| Q | PIXELS$^2$ |
| ⋮ | |

64

| THUMBNAIL (SHAPE) | POLYGON |
|---|---|
| S | "parm$_1$, parm$_2$, ..." |
| ⋮ | |

66

| THUMBNAIL (CATEGORY) |
|---|
| SPIRE |
| ⋮ |

VIDEO QUERY SYSTEM AND METHOD

CROSS-REFERENCES TO RELATED APPLICATIONS

This application is a continuation-in-part of U.S. patent application Ser. No. 08/788,150, filed Jan. 24, 1997, which is a continuation of U.S. patent application Ser. No. 08/720, 993, filed Oct. 15, 1996, which was a continuation of U.S. patent application Ser. No. 08/216,986, filed Mar. 23, 1994, now U.S. Pat. No. 5,579,871, which was a continuation-in-part of U.S. patent application Ser. No. 07/973,474, filed Nov. 9, 1992. All of these applications (and U.S. Pat. No. 5,579,871) are incorporated herein by reference.

BACKGROUND OF THE INVENTION

This invention relates to a computer-executed procedure for searching an image database that includes video by use of queries based on the image characteristics of segmented video frames.

In the prior art, the storage, indexing, and retrieval of video images in a computer database is known. See, for example, the article by M. Flickner, et al entitled *Query by Image and Video Content: The QBIC System*, in COMPUTER, September 1995, pp. 23–32. This article describes an image database that includes still images and video. For query processing of video in a database, images that represent contents of stored video are used. These images are typically in the form of frames, and may comprise individual frames extracted from a sequence of frames (key frames), as well as synthesized frames that are composites of such sequences. Such synthesized frames are very desirable in searching video since they include data respecting motion in the sequences of frames from which they are composed. This permits queries based upon motion, among other things.

Video frames (either key frames or synthesized frames) may be processed by being segmented into objects. In the prior art, an object is a dominant figure in an image. Objects may be identified (automatically or manually) as members of a restricted class of predetermined images, or by user-guided algorithms. In the described prior art image database, queries are allowed on objects, frames, or any combination thereof. In this regard, a query is presented in a form called a "query image" having a semantic significance ("Find images with a yellow star"). The query specifies values of image characteristics such as color, texture, and shape. Similarity is supported by specification of location, distance, and weight. A query response is returned that includes a user-defined number of images that most closely match the query, ranked in order of similarity, based upon the specified image characteristic values and the similarity factors.

Unfortunately, prior art video image databases provide a query capability that is limited to segmentation of images and frames into objects alone. Manifestly, a richer segmentation vocabulary would support greater precision in query specification.

SUMMARY OF THE INVENTION

The invention is based on the inventors critical realization that segmentation of images and frames into one or more objects and background would enrich the query semantics of a video image database system, by permitting specification not only of objects, but also of background.

For the purpose of this invention "background" may be one component of an image or a frame, an object being another component. Intuitively, background would be that portion of an image or frame that remains when one or more objects have been segmented from the image or frame. Further, background would be the visual information that occupies most of the image or frame and is "behind" objects that the image or frame contains. The background of an image or frame is frequently that content of an image or frame that extends to the edges of the image or frame, or to any objects in the image or frame that frame it, or any portion of it.

Although the prior art does have some sense of background as differentiated from objects, the background is monochromatic, non-textured, static, and useful only to define objects of interest. In this regard see, for example, M. Joka, "A Method of Defining the Similarity of Images On The Basis of Color Information", Bulletin of the National Museum of Ethnology, Special Issue, pp. 229–244, No. 17, November 1992. Typically, in such instances, the background is not specified in a query.

Accordingly, the inventor describes a system and method that process a database including video by segmenting a representative video frame into pixels that belong to one or more objects and pixels that belong to background. Values for standard characteristics such as color content, color layout, texture, and size are computed on object pixels. In addition, values for motion characteristics, such as centroid, speed and direction of movement are computed for object pixels. For each group of object pixels that are contained within a respective object, values for image characteristics including color content, color layout, size, and motion of the object's centroid are computed. Similarly, values for standard image characteristics for the background pixels, as well as those for motion, are computed. The computed characteristic values for objects and background are organized and stored in the database. In order to search the database contents, a user can specify, among other parameters, whether to query on background alone, on objects alone, or on a combination of background and objects. A query is executed and results are returned, ranked in order of similarity.

Preferably a plurality of representative frames are segmented and stored in the database, each representing a sequence of frames in one or more video programs. Each of the one or more video programs may be stored in, or in association with, the database.

Accordingly, an object of this invention is to provide a database system containing video with the ability to query database contents based upon segmentation of representative frames into one or more objects and a background. Other advantages of the invention will be understood with reference to the drawings and the detailed description.

BRIEF DESCRIPTION OF THE DRAWINGS

The objectives set forth above and other distinct advantages of the invention will be manifest when the following detailed description is read in conjunction with the below-described drawings, in which:

FIG. 3 illustrates thumbnail definition tables which are used to construct an image query;

Figure 1:
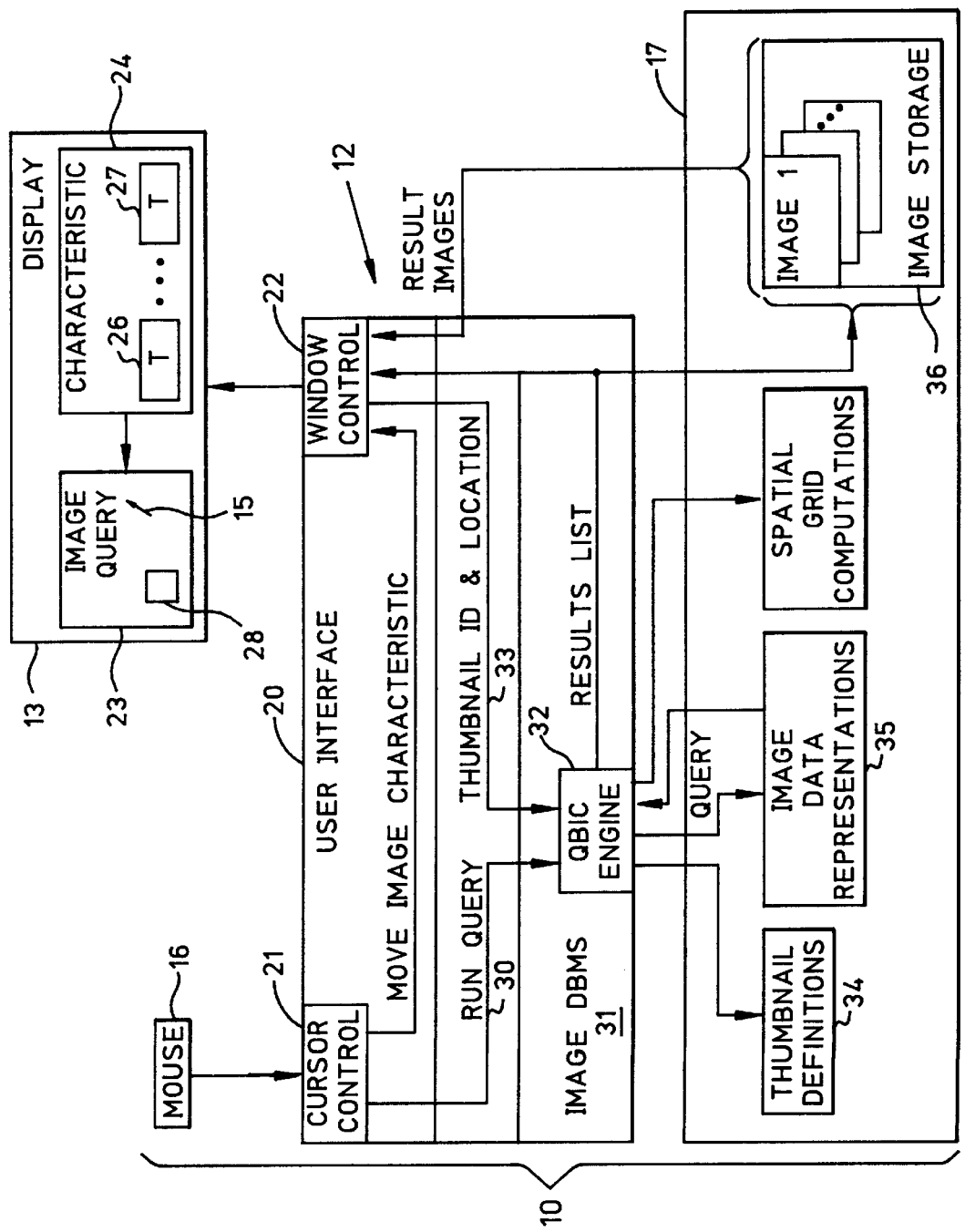
FIG. 1 is a block diagram of an industrial environment in which the invention may be practiced.

IMAGE QUERY SYSTEM DESIGNS
SYSTEM CONTEXT

It will be understood and appreciated by those skilled in the art that the inventive concepts set forth in the embodiments described in this application may be embodied in a variety of system contexts. One such system context is illustrated by way of example in FIG. 1 wherein a data processing system generally indicated by 10 includes a processing unit 12, a video display unit 13, and a cursor control system including a screen cursor 15 and a mouse 16. The mouse is a conventional useractuatable cursor positioner for providing control inputs to the data processing system 10. The data processing system 10 further includes a data storage mechanism 17 which may include various peripheral drives (not shown) and local memory (also not shown) utilized by the data processing system 10 to execute programs, control various hardware and software entities of the system, and to store data.

The data processing system 10 may be selected from any number of conventional processor devices, including, but not limited to, processors commonly found in a class of data processing apparatus known as workstations. A preferred environment of the invention includes a menu-driven user interface 20 including a cursor control 21 and a window control 22. The user interface 20 operates conventionally to provide a menu-driven visual output on the video display terminal 13 consisting of a plurality of "windows" or "containers" which are used in the practice of the invention. One such window 23 is an image query window, which is used for construction of queries based on image content. Another such window 24 is an image characteristic window containing, in a first embodiment, a plurality of icons (hereinafter "thumbnails") 26 and 27. The user interface further provides through the cursor control 21 the ability to control the cursor 15 by movement of the mouse 16. The cursor 15 is used in the first embodiment to "drag and drop" thumbnails from the image characteristics window 24 to the image query construction window 23. A thumbnail which has been dragged and dropped in the image query construction window 23 is indicated by reference numeral 28.

Once thumbnails have been dragged and dropped in the image query window 23, an option is selected denoting a RUN QUERY command represented on signal path 30. In response, the identification and locations of all thumbnails dragged to and dropped in the image query window 23 are provided to an image database management system 31 on a signal path 33.

The image database management system 31 includes a query-by-image-content (QBIC) engine 32 which receives the RUN QUERY command and thumbnail identification and location information and, using the information and thumbnail definitions stored at 34, constructs a query which is used to search image data representations stored at 35. The results of the search are used by the QBIC engine 32 to construct a result list of images satisfying the query parameters. The identifications of these images are used to obtain the identified images from a set of images stored at 36 and the images in the result list are provided to the window control 22 for display in a results window, which is not shown.

As described below in further detail, respective areas are displayed for presentation of image selection characteristics and construction of an image query. These areas may be in the same, or separate windows. The cursor control in the second embodiment is used to "point and click" on a selected image characteristic. By this means, the cursor is invested with the image characteristic and may be used in the image query construction area to paint or draw an image query. Once the query has been constructed, it is dispatched by the RUN QUERY command. As further described, the engine 32 has access to (and may include) an element 37 for computing image query values from a spatial grid in the image query construction area.

Figure 2:
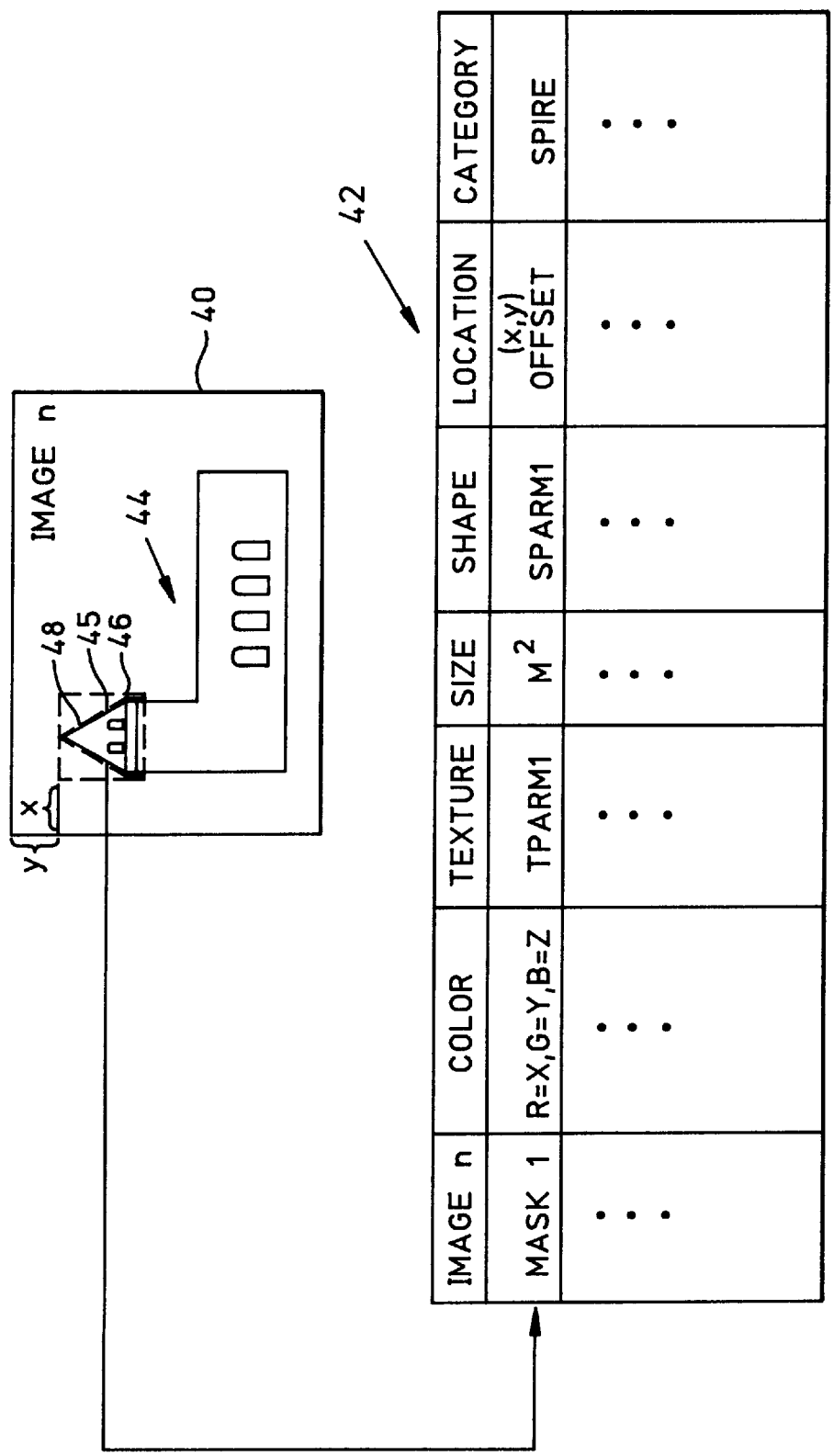
FIG. 2 illustrates how the content of an image is decomposed into tabularized data representations.

FIG. 2 illustrates the structure of an image data representation which enables the structure to be searched in conventional query fashion based on image characteristics. In this regard, for example, an image 40, identified as image n, includes a picture of a church 44 having a bell tower topped with a triangular spire 45. Image n is decomposed into image characteristics including color, texture, size, shape and layout. Arbitrarily, images or image features may be associated with text keywords, image IDs, and categorized by size, origin, and date. The decomposed elements of the image 40 are digitized and tabularized in order to construct the data representation 42. Relatedly, consider the spire 45. Using conventional graphical toolbox techniques, a mask 48 can be defined on the image 40 to enclose the spire 45, the mask itself can be characterized by its shape and the pixel data covered by the mask can be analyzed to determine its color and texture characteristics. In particular, the color of the spire 45 can be decomposed to average red, green and blue values, and texture parameters (TPARMs) can be obtained by known methods, one of which is described, for example, in the Tamura et al article discussed in the Background section of this application. The size of the mask is simply the pixilated area enclosed by the mask 48, while the shape of the enclosed spire 45 can be characterized as shape parameters (SPARMs) by known methods, such as those disclosed by Taubin and Brown, discussed in the Background. The location of the mask may be defined by the offsets in the x and y directions from an origin at the upper-left hand corner of the image 40 to a point in a bounding box 46 enclosing the mask 48. This assumes that the image is displayed as a raster-scanned, two-dimensional array of pixels in which the pixels are scanned, line-by-line, beginning with the upper-left hand pixel. Last, the image, or the individual mask to which it is decomposed can be assigned a text/keyword category. For example, if the image n is one image of a set of images all of which have to do with ecclesiastical architecture, the mask containing the spire might be categorized by the single word "spire".

In this manner, the image 40 is decomposed into the data representation 42. The data representation 42 may be organized conventionally as a tabularized file for image n whose rows correspond to the masks into which the image is decomposed and whose columns corresponds to image characteristics.

A FIRST QBIC SYSTEM DESIGN

Thumbnail data representations (definitions) are stored as described with reference to FIG. 1, and have the general form illustrated in FIG. 3. In FIG. 3, thumbnail definitions for color, texture, size, shape, and category are indicated, respectively, by reference number 60, 62, 64, 66 and 68. Each thumbnail definition represents one of a plurality of thumbnail definitions for a particular referenced characteristic. For example, the thumbnail definition 60 is a data representation for a color thumbnail which may be denoted as a thumbnail M representing a color M. In this regard, M would be the identity of a thumbnail contained in a color characteristic window presented on the display 13 in FIG. 1 during query construction. The definition for the color thumbnail M is a data structure indexed by the identity of the color thumbnail and includes average intensity values for the red, green and blue component of the color M. The definition 62 for texture thumbnail P denoting a smooth texture includes the identity (P) for the smooth texture thumbnail and a data representation for a smooth texture. The data representation can, for example, be represented by a set of texture parameters including coarseness, contrast and directionality. Similarly, the size thumbnail Q represents the size of a pixilated area; the shape thumbnail S can include a data representation using an algebraic moment invariant; and, the spire category thumbnail includes, for example, the text "spire" or additional textural annotation. Note that a layout thumbnail is not required since the location of the bounding rectangle of any thumbnail in the image query window 23 would be available through the window control 22 to the query engine 32.

It should be evident that at least the characteristics of color, texture, size and shape are quantifiable. As discussed above with respect to FIG. 2, each image in the database has a corresponding data representation in which the calculated values for these characteristics are stored for each defined region of interest (mask) in the image. For every mask, specific values for the image characteristics describing visual properties for the mask are calculated and entered into the data representation. Later, when a query is assembled, an object/thumbnail procedure described below is employed to construct a description (a "sample image") of the images which a user wishes to retrieve from the image database, with the query being constructed in terms of values of the image characteristics of interest. The query is used to find images in the database with image characteristic values that are similar to those included in the sample image. To do a query, the QBIC engine 32 converts pictorial query information (e.g., the information from the thumbnails and their location) from the image query window into image characteristic values.

Figure 4:
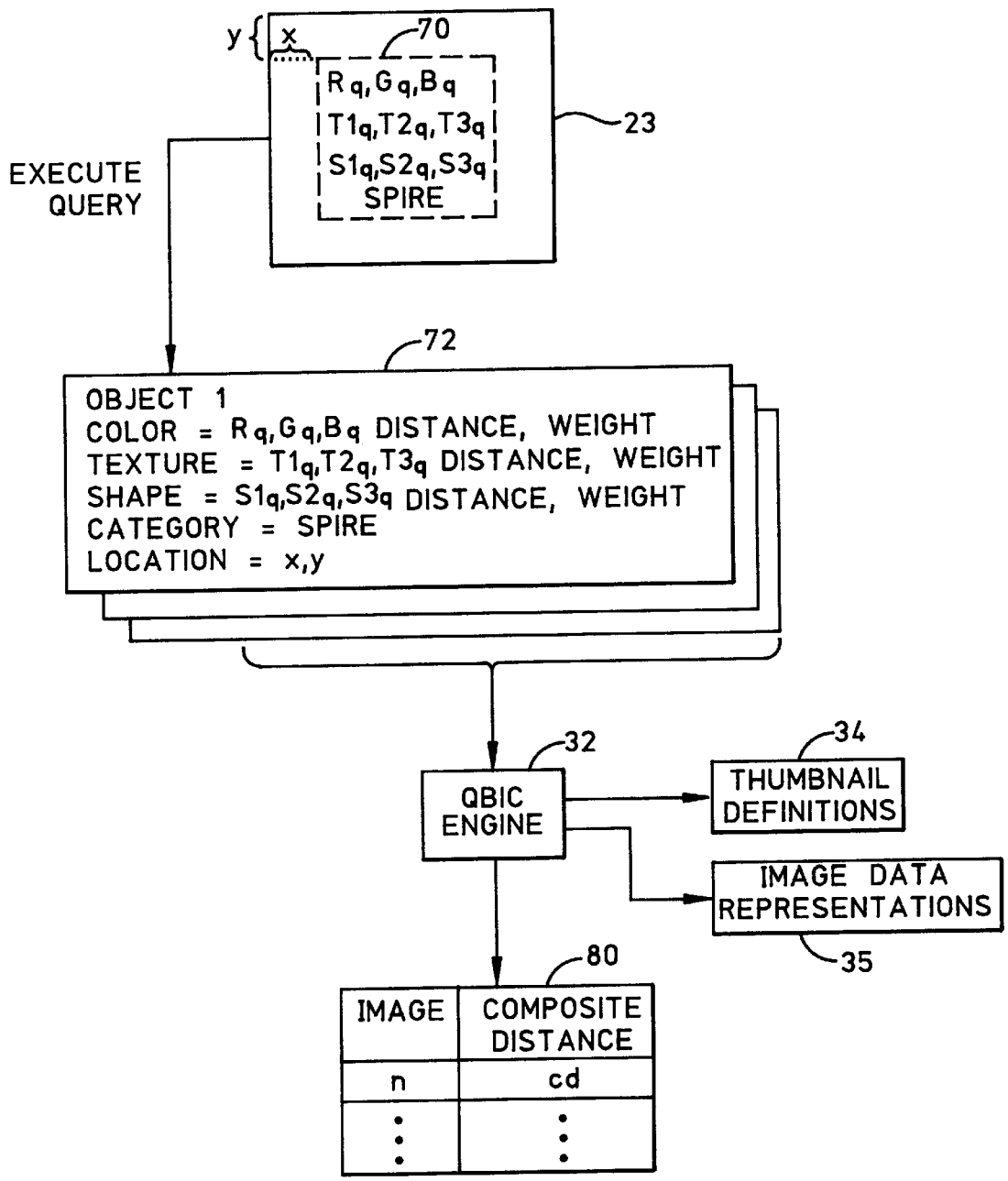
FIG. 4 illustrates construction of an image query using an image query construction window.

FIG. 4 illustrates diagrammatically a process for image query construction and execution where the query is composed by dragging and dropping thumbnails. Initially, a query is assembled by dragging and dropping characteristic thumbnails in the image query window 23. The deposit of a thumbnail creates an object 70. A thumbnail may overlap other thumbnails within the same object. For example, in the object 70, thumbnails for shape (in SPARMS, such as $S1_q$, $S2_q$, $S3_q$, ...), category (spires), color (in color components, such as $R_q$, $G_q$, $B_q$), and texture (in TPARMS, such as $T1_q$, $T2_q$, $T3_q$) overlay each other within a bounding rectangle which defines the object 70. When a query option is selected, the RUN QUERY command is sent, together with a description of all objects in the query window 23 to the QBIC engine 32. For each object, the description includes the identification of the thumbnails within the object and the object's location measured by the offset between its center and the center of the image query window 23. When the RUN QUERY command is given, the QBIC engine 32 interrogates the window control 22 as to objects which are contained in the image query window 23. Each object is described in a data structure, with the data structure for the object 70 indicated by reference numeral 72. Each object data structure includes the identification of the thumbnails which it contains, as well as the offset values significant of its location. The QBIC engine 32 then assembles a query whose predicate includes a portion for each object contained in the query window. Each object portion of the query predicate includes, in any order appropriate to the design, parameters which correspond to the set of image characteristics. The values for those parameters are obtained from the thumbnail definitions 34. If an object does not contain a thumbnail for a particular characteristic, the parameter value for that characteristic is undefined.

The query assembled by the QBIC engine 32 essentially compares the image characteristics values obtained by image query window 23 and the thumbnail definitions 34 against the values for the corresponding image characteristics contained in the image data representations 35. Similarity may be measured, for example, by the euclidian distance (d). For each image, a composite euclidian distance (cd) is calculated between each image object and similarly located masks.

A comparison is performed using the usual query techniques with the following elaboration. For each image data representation, all objects in a query are compared with masks in the data representation, and a composite distance between the image corresponding to the data representation and the sample image is calculated according to:

$$(cd)_{image\ n} = \sum_{i=0}^{k} cd_{mask\ i} \quad (1)$$

Thus, the composite distance ($cd_{image\ n}$) between image n and the sample image is the sum of composite distances ($cd_{mask\ i}$) between masks of the image and the objects of the query. The composite distance between a mask i and an object j is the sum of weighted euclidian distances between the calculated image characteristics (color, texture, size, shape) and the value for the corresponding thumbnail characteristics. The composite distance between mask i and an object is given by equation (2), wherein:

$$(cd)_{mask\ i} = (w_{color}d_{color} + w_{txtr}d_{txtr} + w_{size}d_{size} + w_{shape}d_{shape}) \quad (2)$$

In equation (2), the euclidian distance (d) for each calculated image characteristic is weighted by a value w which is assigned by default or by user action described below when the sample image is constructed in the image query window 23.

The composite distance calculation for a mask is performed subject to conditions. First, if the object includes a category thumbnail, the calculation is performed only for identically categorized masks. Second, the object and mask locations may be compared and thresholded. In this regard, if a mask is located more than a predetermined scalar distance from an object, the euclidian distance between the object and the mask is not calculated.

Similarity between the value of an image characteristic in an object of a query image and the value of the image characteristic in an image mask can be measured by euclidian distance with features first normalized by variance (a) of the characteristic over the entire image database to correct scaling inconsistencies, although other similarity measures may be employed. For example, when querying on RGB color, the distance between mask i and object j is computed as:

$$(d_{ij})_{color} = \frac{(red_i - red_j)^2}{\sigma_{red}^2} + \frac{(green_i - green_j)^2}{\sigma_{green}^2} + \frac{(blue_i - blue_j)^2}{\sigma_{blue}^2} \quad (3)$$

Combining textural, size and shape features is done similarly, by appropriate variation of terms.

The distance calculations for any characteristic value may be thresholded. Thus, assume prespecification of DISTANCE thresholds such as illustrated in FIG. 4. If the distance calculations for any characteristic yield a distance value which exceeds the prespecified DISTANCE value, the calculated value is replaced by zero.

As the QBIC engine 32 executes the query, it assembles a results list 80 which identifies images and ranks them according to their composite distance values. The results list 80 may include all images or only a prespecified number of the closest images. The results list 80 indexes to the images stored at 36, and is passed by the QBIC engine 32 to the window control 22. The window control 22 retrieves the images in the results list from the image storage 36 and formats them appropriately for display in a results window on the display 13.

OPERATION OF THE FIRST QBIC SYSTEM DESIGN

Figure 5:
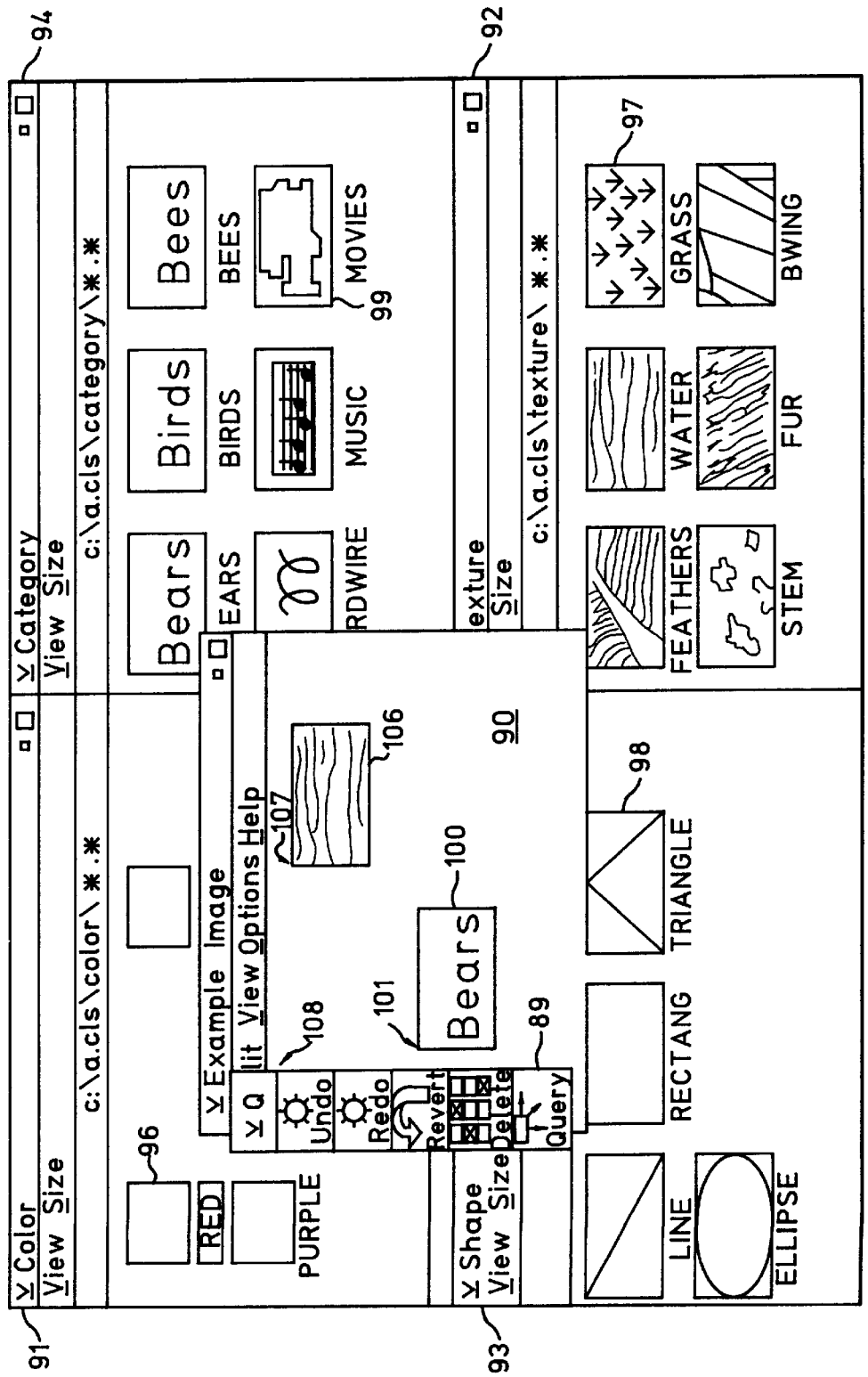
FIG. 5 illustrates the organization of a display screen in which an image query is presented.

The image query process executed by the apparatus illustrated in FIG. 1 is guided by the display of windows illustrated in FIG. 5 which illustrate the first QBIC system design. Initially, an image query screen 90 entitled "Example Image" is displayed. This corresponds to the image query window 23 described above with respect to FIGS. 1–4. The example image window 90 is where users construct a sample image representing the important aspects of the images being sought. The example image window 90 includes a image query (iq) icon 89 on which user may "click" to begin an image query. Alternately, a query object may be dragged to the image query icon 89 or an appropriate command may typed into a command line (not shown).

Four selection windows (containers) are employed: a color container 91, a texture container 92, a shape container 93, and a category container 94. The containers 91, 92 and 93 correspond to characteristics which are innate in an image and which can be calculated as described above from image content. The category characteristic is an arbitrary textual tag which can be appended to an image or an image mask. Each of the selection containers 91–94 contains one or more icons, which are referred to, preferably, as "thumbnails". Each thumbnail in one of the image characteristic containers 91, 92 and 93 corresponds to a prespecified value for an image characteristic. For example, the "RED" thumbnail 96 in the color selection container 91 corresponds to a precalculated value for red taking into account all the components of a particular display scheme which contribute to the particular shade of red given by the thumbnail 96. In the texture selection container 92, the "GRASS" thumbnail 97 corresponds to a set of precalculated textural values. In the shape selection container 93, the "TRIANGLE" thumbnail 98 corresponds to a quantized representation of a triangle.

A sample image can be constructed by dragging thumbnails to the example image window 90 from the color, texture, shape and category selection containers. For example, a "BEARS" thumbnail 100 has been dragged from the category container 94 and dropped in the example image window 90. A "WATER" thumbnail 106 has been dragged from the texture container 92 and dropped in the example image window 90. The locations 101 and 107 of the thumbnails 100 and 106 are determined as described above with reference to the example image window origin 108.

The layout of thumbnails in the sample image affects the results of a query. For example, placing two bear thumbnails next to each other in the example image window indicates a preference for adjoining bear objects in the results set of images that will be selected to satisfy the query.

In order to generate a query based on the thumbnails 100 and 196 dropped in the example image window 90, a RUN QUERY option is selected. When the option is selected, a query is constructed as described above which consists of a predicate with an object portion denoting "bears" at a location corresponding to the point 101 and another object portion denoting a "water" texture with a location at 107.

Figure 6:
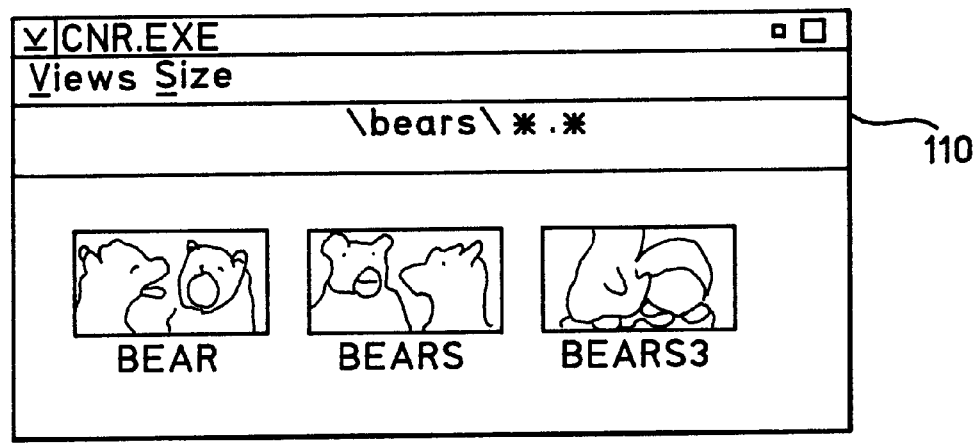
FIG. 6 illustrates a representative result of an image query shown in FIG. 5.

FIG. 6 illustrates how the thumbnails 100 and 106 on the example image window 90 interact with one another to form an image query. In FIG. 6, the "bears/water texture" query returns pictures containing bears and water. The query results are illustrated in a container 110 shown in FIG. 6. The three bear pictures were returned by the query because in each a bear existed slightly off center and there was water in the picture off to the right, which corresponds to the layout information for the two thumbnails illustrated in the example image window 90 of FIG. 5. The order of the returned images is preferably sorted from best to worst match, and the number of images return can be controlled by manipulation of the thumbnail attributes of weight and distance described above.

The example image window 90 preferably is a rectangle that has the same aspect ratio as the stored images. Dragging and dropping thumbnails from the color, texture, shape and category selection containers onto the example image window permits a user to create an example of the kind of image which the user wishes to find.

The placement of the thumbnail is important because the spatial relationship of the dropped thumbnails is used as described above as part of the query criteria. The characteristics of each dropped thumbnail may be arithmetically or logically combined with other thumbnails in the query constructed by the QBIC engine 32. As described above, thumbnails may be overlapped. As stated previously, when thumbnails of different image characteristics overlap, they are considered to be part of the same object. For example, if the category thumbnail "BEARS" overlaps a "RED" thumbnail, images containing "BEARS" are selected, and in this set, the images are ordered according to their similarity to the "RED" thumbnail. If the "BEARS" and "RED" thumbnails did not overlap, images including bears and red in their respective locations would be returned.

Figure 7:
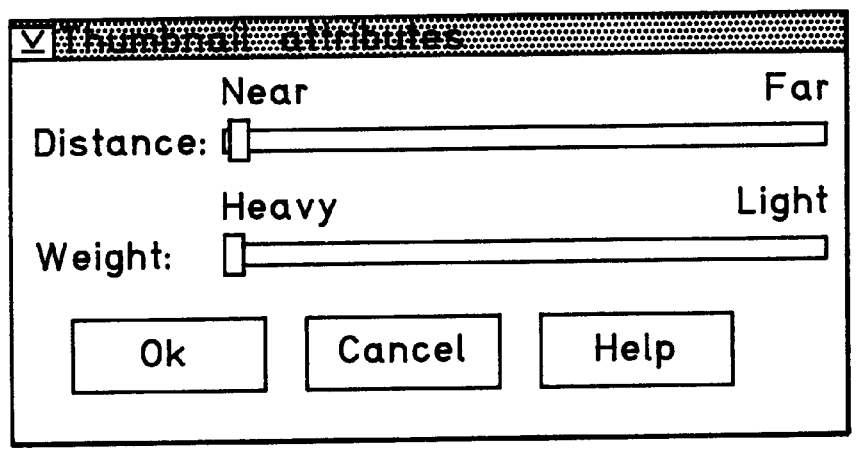
FIG. 7 illustrates a context dialogue box.

A context dialogue box illustrated in FIG. 7 is displayed when the cursor is placed on a thumbnail and a preselected mouse button is clicked. The context dialogue box provides two control bars for setting, respectively, distance and weight of the thumbnail. Preferably, the setting of the distance control thresholds the value of the thumbnail characteristic, indicating how close the value must be to the value of a mask characteristic in order to include the characteristic in a query calculation. The setting of the weight control determines the weighting factor for this characteristic. Manifestly, the adjustment of thumbnail values for multiple thumbnails can establish a relative weighting among thumbnail values for query construction. For example, suppose, in the "BEAR" and "WATER" example described above, a user is very interested in image color but less interested in the texture of images. In this case, the user would increase the color attribute, but lighten the weight of texture.

Figure 8C:
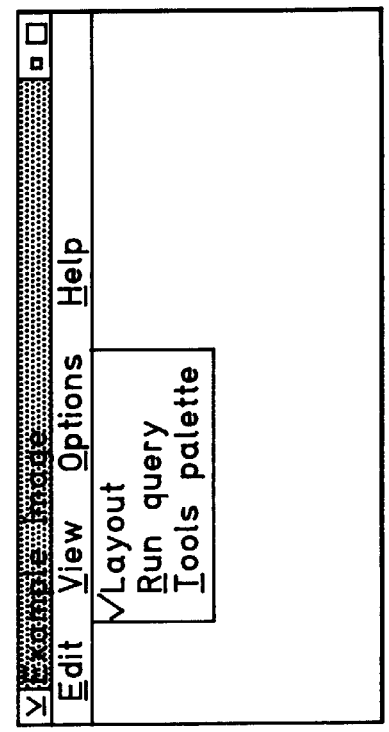
FIGS. 8A–8C illustrate various dialogue boxes.
Figure 8A:
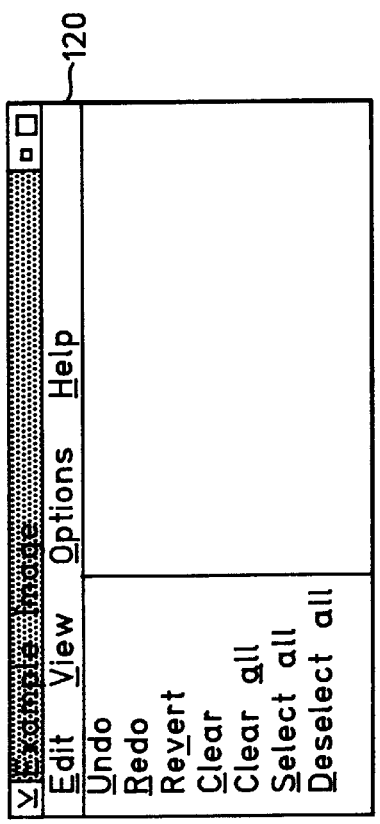

FIG. 8A illustrates an example an image menu bar 120 with an EDIT option pull down 122. The edit option pull down allows thumbnails previously dropped in the example image window to be manipulated. The UNDO option causes the last change in the example image window to be removed. For example, suppose that the "BEARS" thumbnail was dragged and dropped on to the example image window. Clicking on UNDO removes the dropped thumbnail. Selecting the REDO option causes the last undone change to be restored. Thus, clicking on REDO would restore the bear thumbnail in the example image window which was "undone" in the previous action. The REVERT option discards all changes made since the example image window was opened and restores the view of the last version, which may be stored on disk. The CLEAR option deletes all selected thumbnails in the example image window. The CLEAR ALL option deletes all selected objects in the example image window; in this regard, it is the equivalent of SELECT ALL followed by CLEAR. The SELECT ALL option marks all thumbnails in the example image window as selected. "ALL" thumbnails include any that may be hidden beneath other thumbnails. The DESELECT ALL option unmarks all thumbnails previously selected.

Figure 8B:
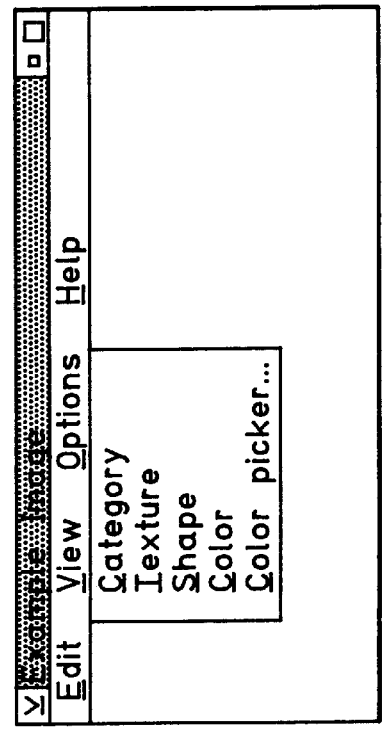

The VIEW option pull down, illustrated in FIG. 8B, controls the visibility of the other selection containers used in image query construction. In this regard, once the example image window is selected and an image query is initiated, the selection windows are conventionally designated as "child" process windows. Thus, when any of the VIEW options is checked, the associated child process selection window appears. If an option is unchecked, the associated child process window disappears.

The COLOR PICKER option displayed in the pull down of FIG. 8B enables the user to set an absolute color using a COLOR PICKER process window. This option allows a user to establish a thumbnail of any selected absolute color. Accordingly, a segmented color pie chart is displayed. To select the displayed color, the user picks a pie segment by moving the cursor to the segment and clicking a mouse button. The selected color is displayed in a "Sample Color" box. To fine tune a selection, the user clicks and drags a cursor anywhere in the pie chart until the desired color is displayed. To display the gray scales of a particular hue, the desired pie segment is double clicked and the color is selected. A following double-click anywhere in the pie chart will return the Color Picker process to the polychrome mode. Moving RED, GREEN or BLUE sliders in the Color Picker window enables a user to mix a color directly. Numbers to the left of the RED, GREEN and BLUE sliders correspond to actual gun values. Pressing an HIS switch switches the three sliders to, respectively, hue, intensity and saturation values. Pressing an OK button dismisses the Color Picker dialogue box and displays a thumbnail of the selected color in the center of the example image window. This thumbnail may then be manipulated like any other.

The OPTIONS pull down from the menu illustrated in FIG. 8A is shown in FIG. 8C. In this menu, the Layout check box enables or disables the spatial relation. When enabled, the thumbnail positional relationships to one another are accounted for as discussed above in the calculation of mask composite distances. If the Layout check box is disabled, the composite distance calculations are not thresholded by the scalar distances between objects and masks. Effectively, if Layout is disabled and the example image window, for example, contains two "bird" category thumbnails, then the query would select all images in the image database that contains at least two birds. The Run Query option corresponds to the RUN QUERY command that, when selected, results in execution of the query.

Figure 9:
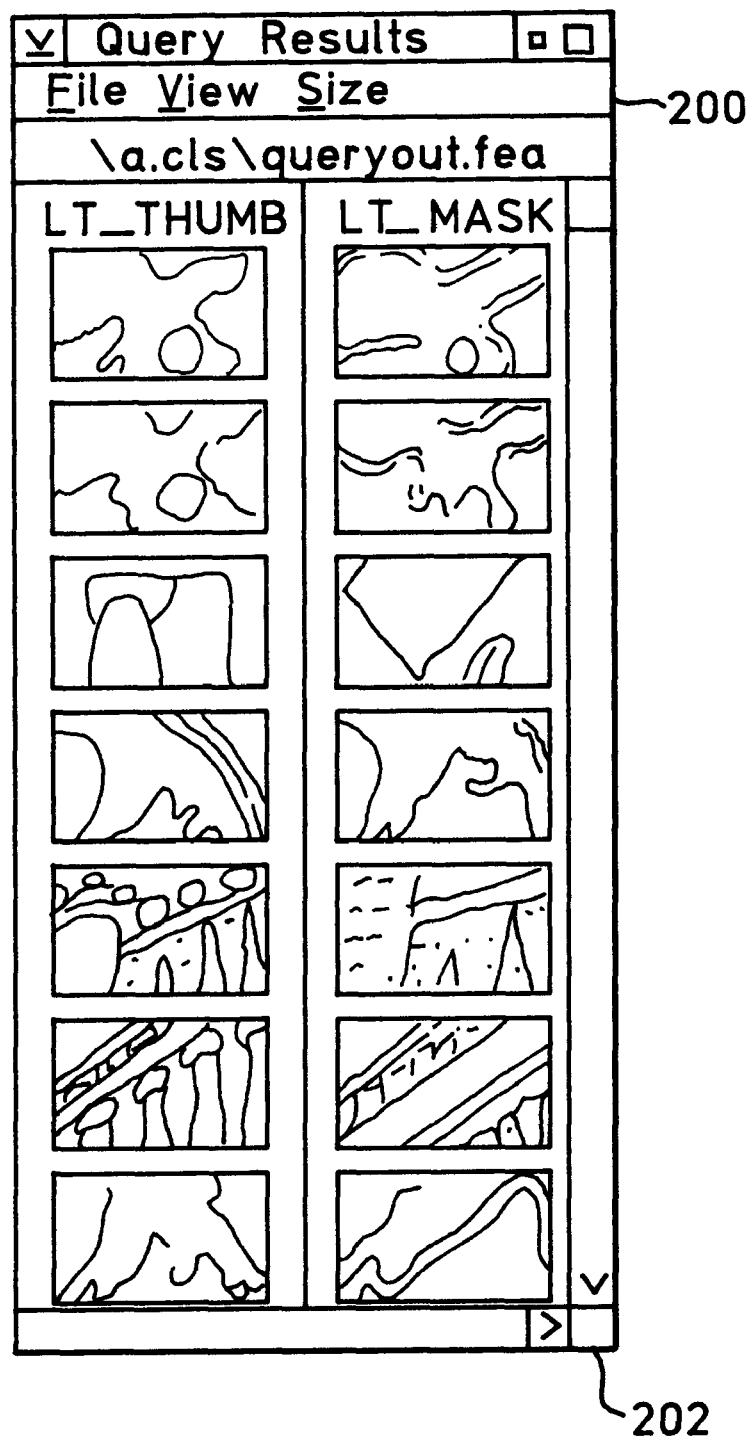
FIG. 9 illustrates a results window displayed in response to an image query.

Query results are displayed as illustrated in FIG. 9. In FIG. 9, results are included in a Query Result window 200 which includes at least three columns. The first column (LT_THUMB) includes a thumbnail for a complete image. The second column (LT_MASK) shows a selected sub-area of the image with one or more mask outlines. The third column 202 illustrates graphically the composite distance of an image from the input query. The query results are displayed in the order of most similar to least similar.

Figure 10A:
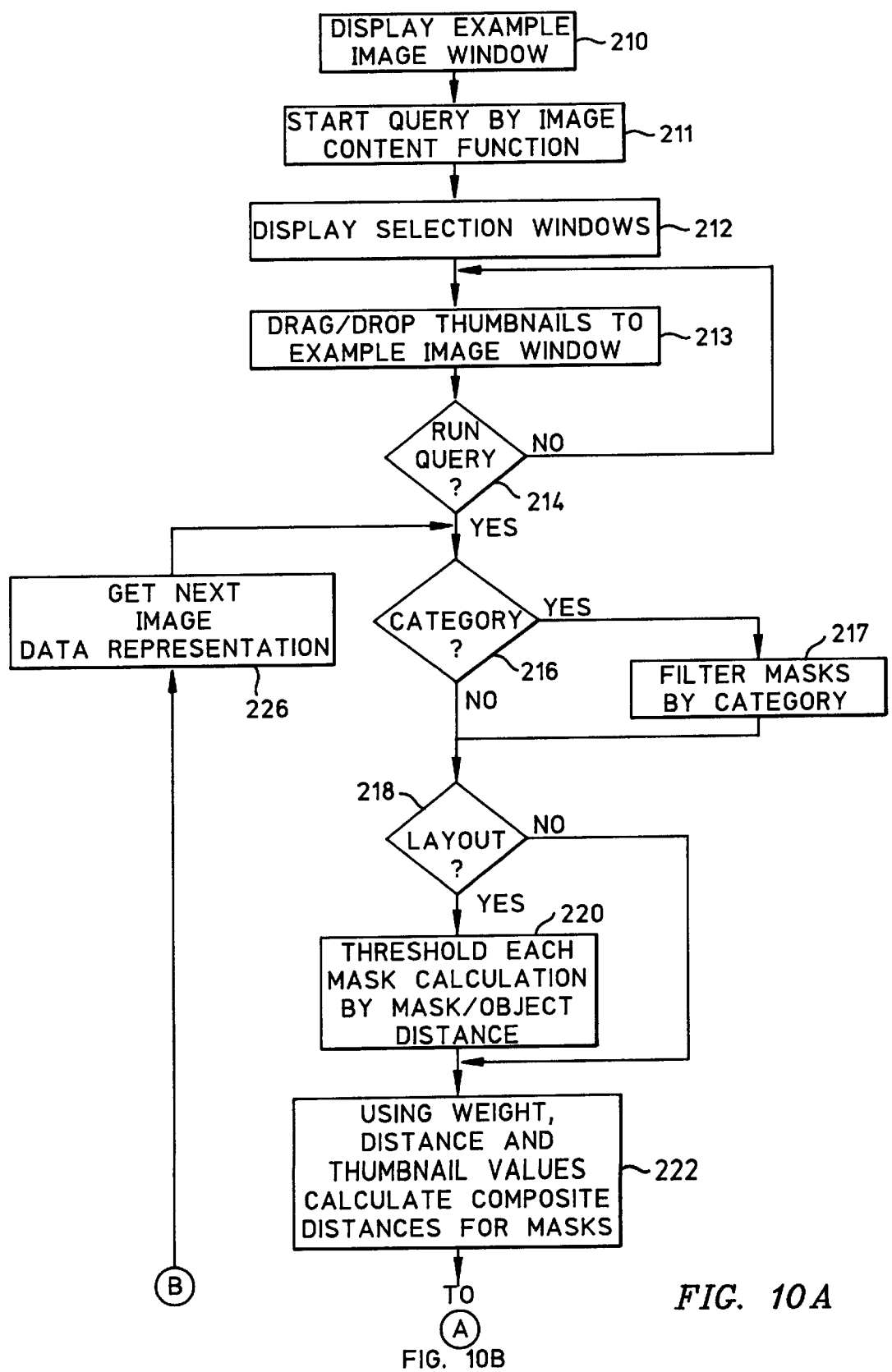
FIGS. 10A and 10B comprise a flow chart that illustrates a method of image query construction.
Figure 10B:
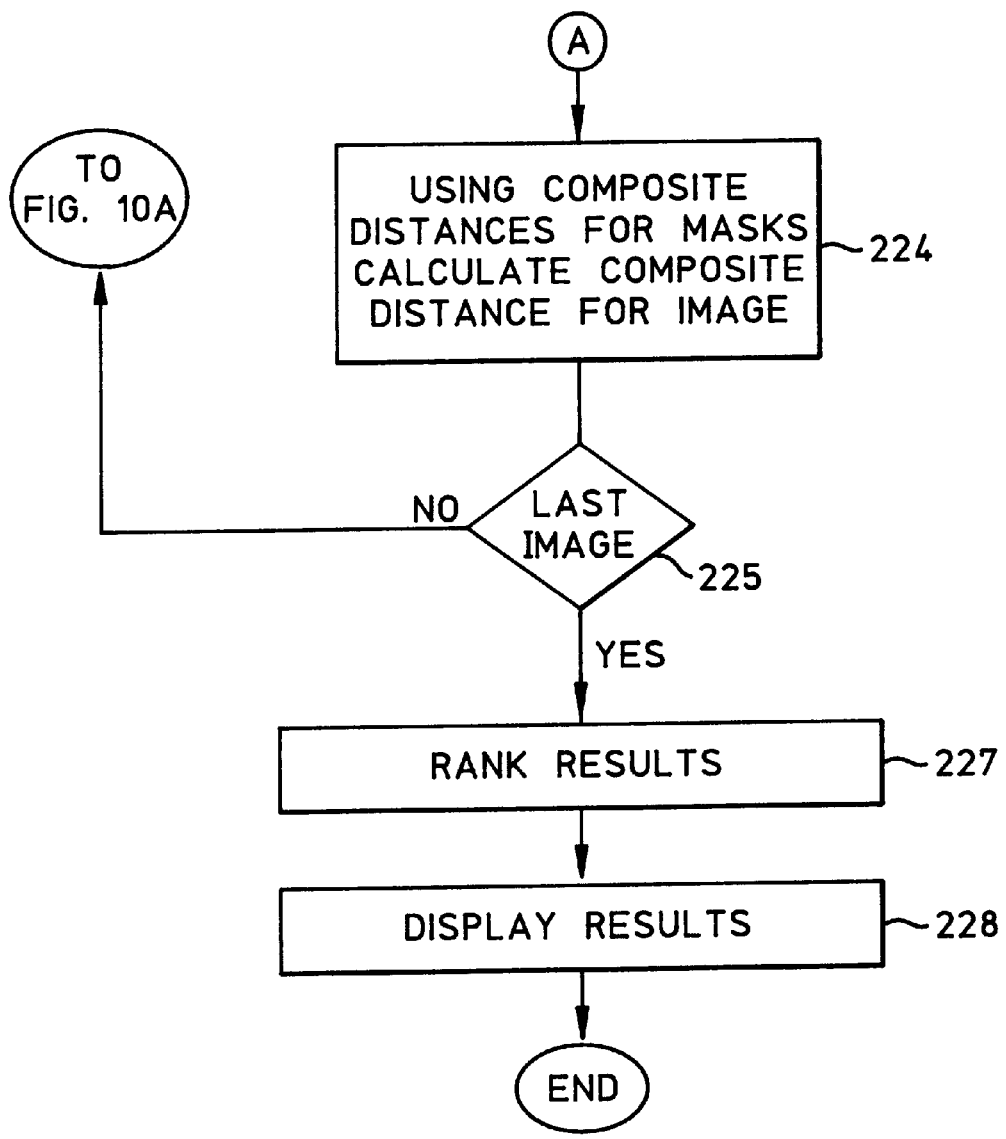

FIGS. 10A and 10B comprise a flow chart describing a process for image query composition. In FIG. 10A, the process is initiated in step 210 by displaying an example image window such as the window 90 illustrated in FIG. 5. A query-by-image content procedure is initiated in step 211 by, for example, selecting the query button 89 in the example image window 90, which issues a RUN QUERY command. In step 212, selection windows are selected and displayed using the view pulldown illustrated in FIG. 8B. Thumbnails are then dragged from selection windows and dropped in the example image window in step 213. For as long the RUN QUERY command is not selected, the negative exit is taken from decision 214 and the sample image being constructed in the example image window can be edited or added to in step 213. When the RUN QUERY command is selected, the positive exit is taken from decision 214 and, for each image in the database, the procedure executes a sequence of steps beginning with decision 216 and ending with step 225. Recall that selection of the RUN QUERY command sends a set of data structures describing objects in the sample image to the QBIC function. Each object data structure is inspected to determine whether the object includes a category thumbnail. If so, the positive exit is taken from decision 216 and the masks in the current image are filtered by the category code in the data structure in step 217. The decision 216 then establishes the set of masks of the current image which will be analyzed for composite distance with respect to the image characteristic values returned in the data structure for this object. The set of masks established in the decision step 216 are then subjected to the composite distance calculations as described above with reference to equations (1)–(3). In step 218, the layout option is inspected. If enabled, the composite distance calculations for each mask are thresholded by mask/object distance in step 220. In step 222, taking account of the outcome of decision 218, composite distances between objects of the sample image and the filtered and thresholded masks of the current image are calculated using the weight, distance, and thumbnail values return for the object in step 222. Next, in step 224, the composite distance for the image is calculated. If the image is not the last in the set of images, the negative exit is taken from step 225 and the composite distance for the next image is calculated as just described. Otherwise, the positive exit is taken in step 225, the images are ranked according to the results of the composite distance calculations in step 227 and the result of the ranking are displayed in step 228.

OPERATION OF A SECOND QBIC SYSTEM DESIGN

The second QBIC design builds an image query by a user-specified "painting" in an image query area. This design finds images according to a user-specified pattern consisting of image characteristics at specified positions; it includes components corresponding to elements of the system shown in FIG. 1, as follows:

1. Image Storage. Each image is stored as an IxJ array of pixels. Each pixel includes one or more multi-bit words denoting image color at the pixel location, either directly or using a color look-up table.

Figure 11A:
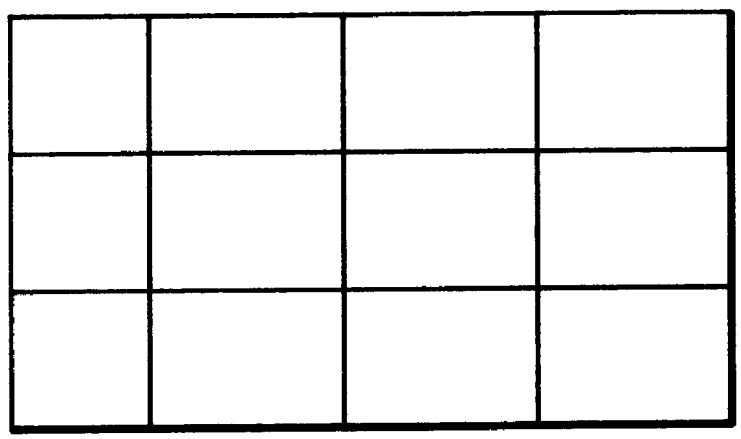
FIGS. 11A and 11B illustrate spatial partitioning of an image.
Figure 11B:
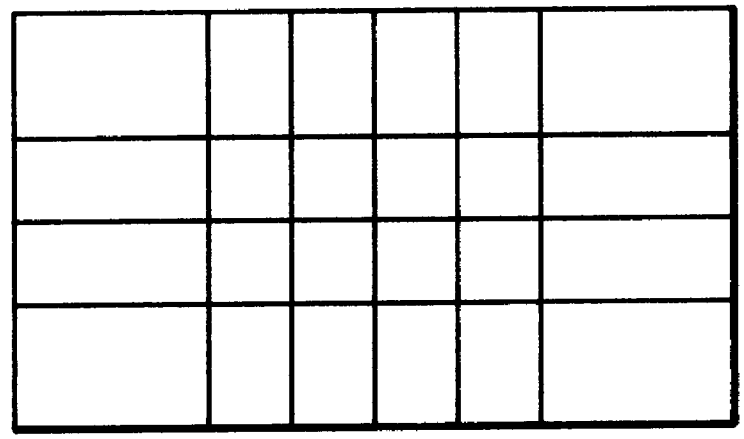

2. Spatial Partitioning. The pixel array of each image in the image store is spatially partitioned, such as into a rectangular grid, a radial grid providing finer granularity in the center of the image, or any other quantization that fits the image data and application. This partitioning need not be fixed for all database entries. In fact, dynamic mapping may be used for greatly differing resolutions of images, image content based segmentation, or user selection at database population time. Two examples of a spatial partitioning of the images are shown in FIGS. 11A and 11B. The partitioning of FIG. 11A is by a regular grid, dividing each image into a 3×4 array of grid areas. The partitioning of FIG. 11B results in finer grid areas in the center of each image.

3. Feature Computation to populate the database of image representations for use during Image Query. For each image in an image database, using the areas defined by the partition in Step 2, a set of image characteristics is computed for each area. Possible image characteristics include measures such as image color, texture, and/or edge content. The area and characteristic information are stored in the storage reserved for image data representations.

The feature computation algorithm can be represented as:

```
For each image I(j) in the image collection
    For each area A(k) defined by the spatial partition
        For each image feature F(l) (such as color features,
            texture parameters, etc.)
            Compute feature F(l) over area A(k)
        End
    End
    Store in the database the set of F(l) for each A(k)
End
```

The result of this step is a table or database such as is shown in Table I containing the computed information. This example is for r total features, s different areas in the spatial partition, and t total images in the image collection. F(j,k,l) is used to represent the l-th feature in the k-th area in the j-th image.

TABLE I

| I(1) | A(1) F(1,1,1,) F(1,1,2) F(1,1,3) ... F(1,1,r) |
| | A(2) F(1,2,1,) F(1,2,2) F(1,2,3) ... F(1,2,r) |
| | A(3) F(1,3,1,) F(1,3,2) F(1,3,3) ... F(1,3,r) |
| | A(4) F(1,4,1,) F(1,4,2) F(1,4,3) ... F(1,4,r) |

TABLE I-continued

| | . |
| | A(s) F(1,s,1) F(1,s,2) F(1,s,3) ... F(1,s,r) |
| I(2) | A(1) F(1,1,1,) F(1,1,2) F(1,1,3) ... F(1,1,r) |
| | A(2) F(1,2,1,) F(1,2,2) F(1,2,3) ... F(1,2,r) |
| | A(3) F(1,3,1,) F(1,3,2) F(1,3,3) ... F(1,3,r) |
| | A(4) F(1,4,1,) F(1,4,2) F(1,4,3) ... F(1,4,r) |
| | . |
| | A(s) F(2,s,1) F(2,s,2) F(2,s,3) ... F(2,s,r) |
| I(3) | A(1) F(3,1,1) F(3,1,2) F(3,1,3) ... F(3,1,r) |
| | . |
| I(t) | A(1) F(t,1,1,) F(t,1,2) F(t,1,3) ... F(f,1,r) |
| | A(2) F(t,2,1,) F(t,2,2) F(t,2,3) ... F(f,2,r) |
| | A(3) F(t,3,1,) F(t,3,2) F(t,3,3) ... F(f,3,r) |
| | A(4) F(t,4,1,) F(t,4,2) F(t,4,3) ... F(f,4,r) |
| | . |
| | A(s) F(t,s,1) F(t,s,2) F(t,s,3) ... F(t,s,r) |

4. Query Specification. To specify a query, obtain an approximate specification of the image characteristics that occur in some area or areas of the image. Specification of image characteristics in only a few areas is explicitly supported. The specification can be obtained from a set of thumbnails, an interactive feature "picker" in an image characteristics window, or from another image. Single or multiple features may be specified per area.

Figure 12:
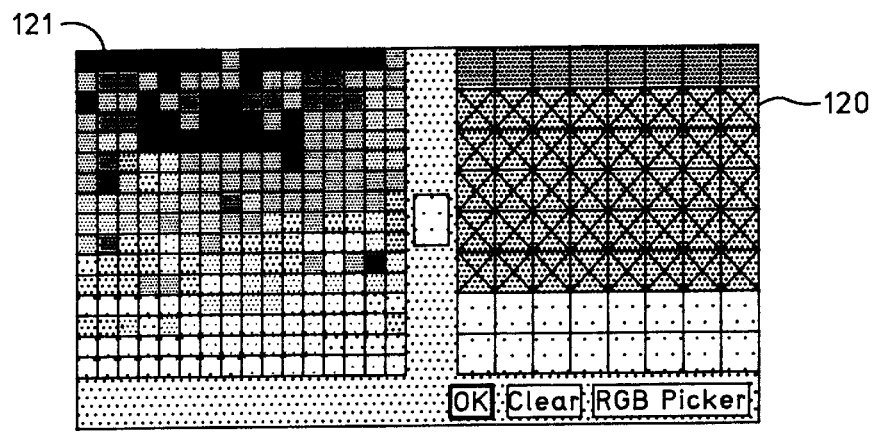
FIG. 12 illustrates the organization of a "blackboard" display screen that supports image query composition.
Figure 13:
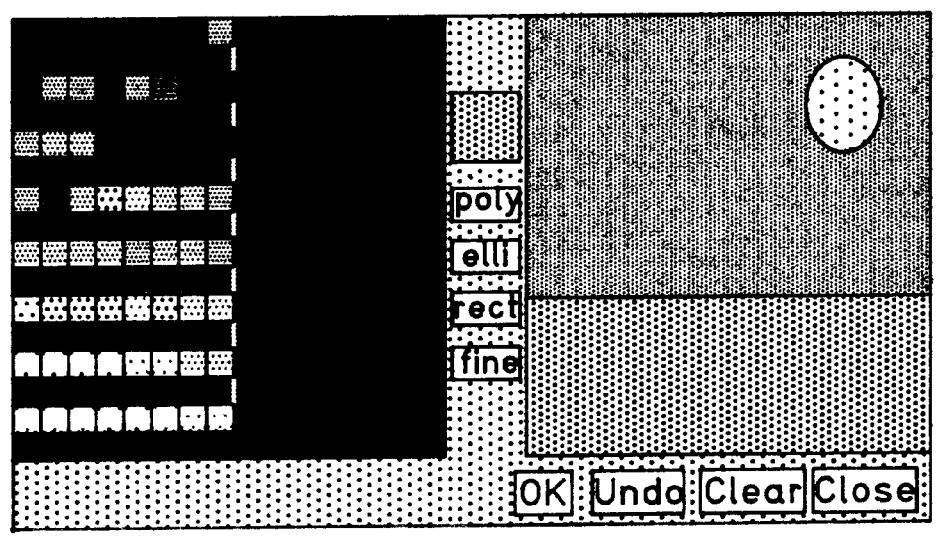
FIG. 13 illustrates a display screen containing an image query drawn with a freehand positional picker.

Examples of feature "pickers" used to obtain a query specification are:

a. Display a block "positional picker". An example is shown in FIG. 12. The example allows a user to specify a query based on positional color feature by explicitly drawing or painting them in a block-like manner. In this regard, the image query composition area 120 is two-dimensionally partitioned in a similar, but not necessarily the same manner as the images. For example, the grid in the query area 120 is partitioned into 64 grid positions. The color characteristic area 121 displays a multi-dimensional array of color choices. Any color may be picked from the color choice array and placed in any grid position of the query composition window. The algorithm supporting the picker is:

```
Repeat until the user clicks on the OK button
    If the user clicks on a color box in the left side of
        the menu
        Make this the current color
    If the user clicks on a grid box in the right side of
        the menu
        Place the current color in the grid box
End
Return an array of the set of grid boxes with their
    associated color
``` b. Display a freehand "positional picker". An example is given in FIG. 13 in which the user is allowed full freehand drawing in the image query window. The example shows green (grass) in the bottom portion of the image, blue (sky) in the top portion, and a yellow circle (the sun). The algorithm supporting this picker is:

```
Repeat until the user clicks on the OK button
    If the user clicks on a color box in the left side of the menu
        Make this the current color
    If the user draws in the drawing area in the right side
        of the menu
        Paint the user drawing with the current color
End
Return a drawing area containing the drawn colored shapes
``` c. Display an image (call this the query image) and let the user outline areas of the image that are "relevant". That is, the user draws polygonal "areas of interest", and all remaining area is considered "don't care". The algorithm supporting this picker is:
Display an image
Let the user draw (multiple) polygonal areas on the image
Return a copy of the image in which pixels in the polygonal areas are unchanged, all others flagged as "don't care"
These examples use color as the positional feature. Other features, such as positional texture, may also be used.

5. Similarity matching. For each image in the collection, compute its similarity score:
   (a) For each area specified in the query, compute a positional feature score that compares the area's similarity to the image areas computed in Step 3. This score combines both features along with positional similarity so that areas with similar features get higher scores, dissimilar features get lower scores, and areas positionally close get higher scores, and areas positionally far get lower scores. The result is a score, for each query area, of its positional feature similarity within this image. The highest scores will be obtained by areas both positionally close and with similar features. Indexing techniques could be used to increase the performance of searching for the "best" matches.
   (b) Combine the scores of all query areas to give a global score for the image.
   (c) Rank the images by their global scores and return, as the results of a query, the images with the best scores.
An algorithm supporting similarity matching is:

```
For each image I(j) in the image collection
    Initialize the similarity score S(j) for this image
    If necessary, map the features of the picker and the features from
        the query (e.g., the picker) to a common spatial grid
    For each area A(k) defined by the spatial partition
        For each image feature F(1)(such as color features,
            texture parameters, etc.)
            If the user specified a value for this feature in this area
                (that is, if Q(1) is not "don't care")
                Compute a similarity score between the picker
                feature
                    Q(1) and the image feature F(j,k,l) for
                    this area. The scoring is flexible in that
                    it accounts for approximately matching
                    in both the feature values and in their
                    position by looking in neighboring areas.
                    Accumulate this score in S(j)
            Endif
        End
    Endif
```

-continued
```
Order the set of similarity scores S(j)
Display to the user the images with the best similarity scores
```

The step above of mapping the picker features and query features is necessary if they are given on a different spatial grid. For example, if the set of areas A(1), . . . , A(s) in Step 2 over which the image features have been computed correspond to an 8×8 grid, and the freehand positional picker were used, then a 64 element query array Q, with one element for each of the 8×8 grids, can be computed as:

```
Divide the freehand drawing into an 8×8 grid
For each grid area in the freehand drawing
    Find the number of pixels in the area of each possible color
    Find the color C with the largest number N(C) of drawn pixels
    If N(C) is larger than some threshold (say ¼ of the size
        of the grid area)
        Set the query array element Q(s) for this grid area to C
    Else
        Set the query array element Q(s) for this grid area to "don't
        care"
End
```

Similarly, if the image masking picker were used, feature values from the query image within the areas covered by the drawn polygons are averaged in each area corresponding to the 8×8 grid.

In summary, the matching algorithm described above consists of two parts. The first is done once per image, for example, when an image is loaded into the database, and consists of computing and storing data about the image. The second is the actual matching, done at query time.

A specific example of the second embodiment is as follows:

IMAGE STORAGE

As described above, each image consists of an array of pixels describing the color of the corresponding image location.

Each image is partitioned into an N X M set of blocks. Other partitions may be used, such as irregular partitions, partitions with finer resolution in the image center where more detail is expected, etc. In this embodiment, blocks correspond to the set of boxes used in the image query composition window 120 of the user interface. The blocks are of approximate size (number of image lines/N) lines by (number of image pixels per line/M) pixels. Let B be the number of partitioned blocks, M X N.

FEATURE COMPUTATION

In this example, color is used as the image characteristic. It can be represented as average color or, alternately, as a list of the most frequently occurring colors in each block. For the latter case, within each block, a k-level color histogram (typical values of k are 32, 64, and 256) is computed, and the top t values are kept, where typically t<k, giving a table for each image of the form:

TABLE II

| BLOCK | COLOR | COUNT | COLOR | COUNT | ... | COLOR | COUNT |
|---|---|---|---|---|---|---|---|
| 1 | $c_1(1)$ | $p_1(1)$ | $c_1(2)$ | $p_1(2)$ | ... | $c_1(t)$ | $p_1(t)$ |
| 2 | $c_2(1)$ | $p_2(1)$ | $c_2(2)$ | $p_2(2)$ | ... | $c_2(t)$ | $p_2(t)$ |
| 3 | $c_3(1)$ | $p_3(1)$ | $c_3(2)$ | $p_3(2)$ | ... | $c_3(t)$ | $p_3(t)$ |
| 4 | $c_4(1)$ | $p_4(1)$ | $c_4(2)$ | $p_4(2)$ | ... | $c_4(t)$ | $p_4(t)$ |
| . | . | . | . | . | . | . | . |
| . | . | . | . | . | . | . | . |
| . | . | . | . | . | . | . | . |
| B | $c_T(1)$ | $p_T(1)$ | $c_T(2)$ | $p_T(2)$ | ... | $c_T(t)$ | $p_T(t)$ |

$c_1(1)$ is the color (or index of the color) in the color histogram of the bucket with the largest percentage of pixels in the first (i.e., upper left) block of the image, $p_1(1)$ is the percentage of the pixels in that image block that fall in this bucket, and, in general, $c_i(k)$ and $p_i(k)$ are the color and percentage, respectively, for the histogram bucket with the k-th largest percentage of pixels in block i.

This table (excluding the first column, which is not stored) is computed and stored for each image. Its size is B X 2t when t<<k but most B X k. (When t≈k, efficient coding techniques can be used, such as listing excluded values of color. or, when t=k, omitting the values altogether.)

QUERY SPECIFICATION

A sample user interface (the one implemented by the inventors) for the case of color features consists of the image query composition window 120 or "blackboard" as shown in FIG. 12, divided into an N X M array of boxes. A user fills in rough color-and-position estimates by selecting a color from the available set of colors in the color characteristic window 121 and dropping it in any set of boxes. A color may be dropped in multiple boxes, and additional colors can be dropped in other boxes. Boxes in which no color is dropped are "don't care". An example completed query specification is shown in FIG. 12.

SIMILARITY MATCHING

Once a set of boxes has been colored, the query is initiated. The method finds images in the database that have approximately the specified Color in approximately the specified position.

The matching process takes the specifications of a query and ranks images in the database according to how well they match the query. Inputs to the matching are the query specifications from the image query construction window, and the tabular data described above. Output is a ranked list of the images in the database, ranked in order of their match to the query specification.

The matching process requires a color similarity function giving the similarity between any two colors. To define this, the process starts with a color distance function. Many choices are possible. Euclidean distance in L*a*b* space may be used, for example. This distance function is referred to as $d_C(color_1, color_2)$. From this, the color similarity function is defined as:

$$s_C(color_1, color_2) = 1 - d_C(color_1, color_2)/(\max d_C) \quad (4)$$

where max $d_c$ is the maximum value of $d_C(color_1, color_2)$ over all color pairs. Similar colors have $d_C$ near zero and $s_C$ near 1; different colors have $d_C$ large, and $s_C$ near 0.

The query specification from the image query construction window is a list $q_i$, i=1, . . . , MxN giving the selected color for each block. $q_i$ can be specified as a triple of red, green, and blue values (r,g,b), an index into a pre-selected color table, or any convenient method of specifying a color. Some method is used to indicated a "not specified" or "don't care", such as a special value of $q_i$ or a separate binary array.

For each image in the database, matching is performed as follows. For each block for which $q_i$ is not "don't care", the similarity between the color $q_i$ in the i-th block and the colors in the corresponding block of image h is computed. An example block similarity function is:

$$s_i^h = \sum_{k=1}^{t} p_i^h(k) s_C(q_i, c_i^h(k)) \quad (5)$$

To make the similarity matching robust to position, the process also searches in neighboring image blocks for good color similarity, and extends the similarity matching to match query block i with image block j:

$$s_{i,j}^h = \sum_{k=1}^{t} p_j^h(k) s_C(q_i, c_j^h(k)) \quad (6)$$

Using this position-robust measure, the similarity score $s_i^h$ for block i in image H is:

$$s_i^h = \max_{j \in \text{neighborhood\_of\_i}} w_{i,j} s_{i,j}^h \quad (7)$$

where $w_{i,j}$ is a weighing function that increases the similarity of blocks close to block i. In this implementation, a neighborhood is used consisting of i and its 8-neighbor blocks, and $w_{i,j}=½$ for i=j, $w_{i,j}=⅓$ for 8-neighboring j values, while $w_{i,j}=0$ for the other blocks.

The final position color similarity for image h over all $q_i$ is:

$$S^h = \Pi_i S_i^h \quad (8)$$

where the product is over all i for which $q_i$ is not "don't care".

Figure 14:
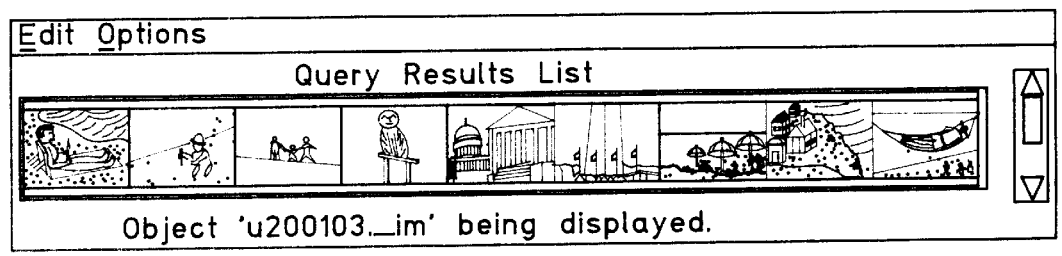
FIG. 14 illustrates a display screen showing results of the query represented in FIG. 12.

Query results are shown in FIG. 14.

DETAILED DESCRIPTION OF THE PREFERRED EMBODIMENT

Figure 15:
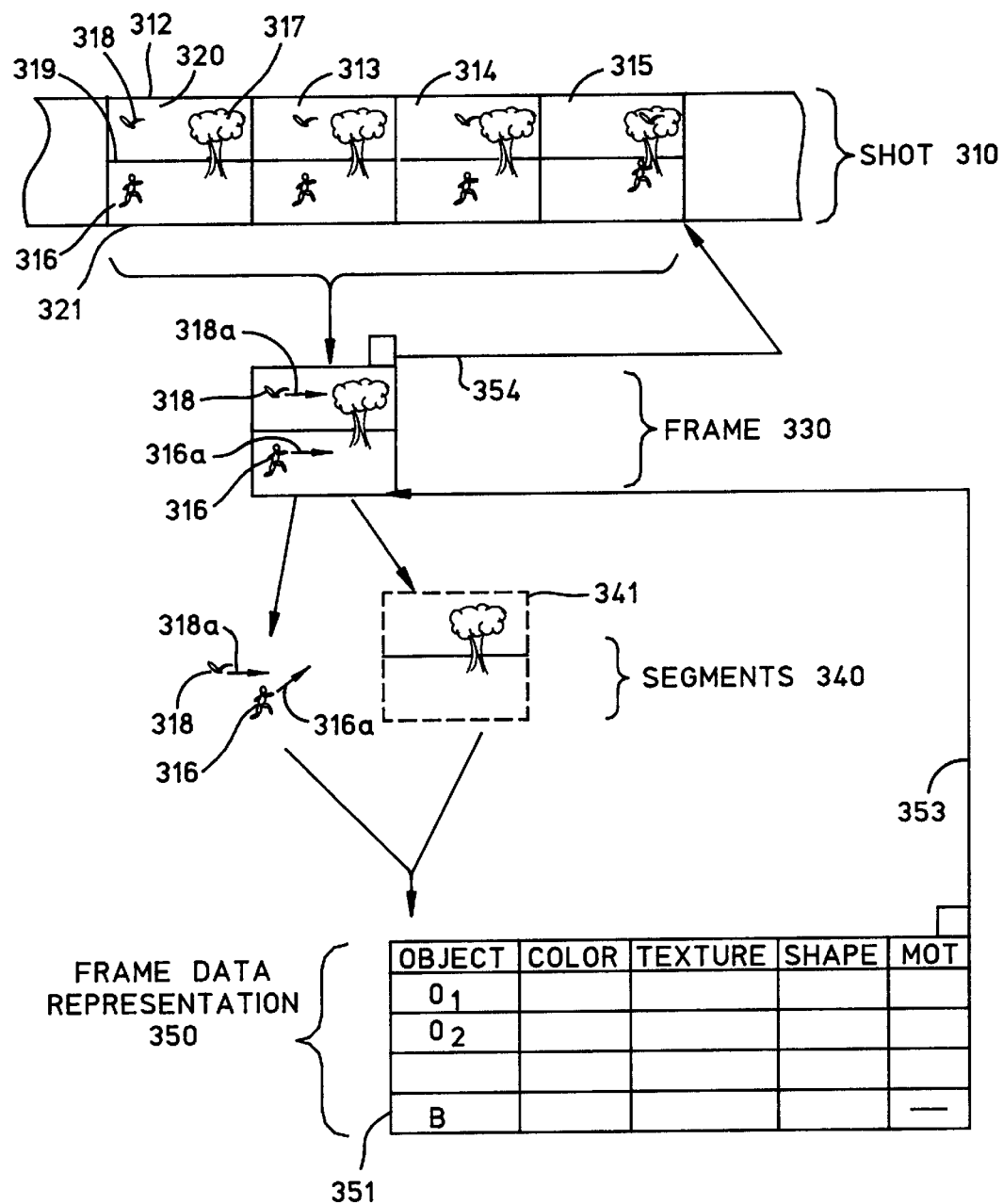
FIG. 15 illustrates decomposition of a frame representing a video sequence into one or more objects and a background, and storage of a data structure that represents the frame.
Figure 16:
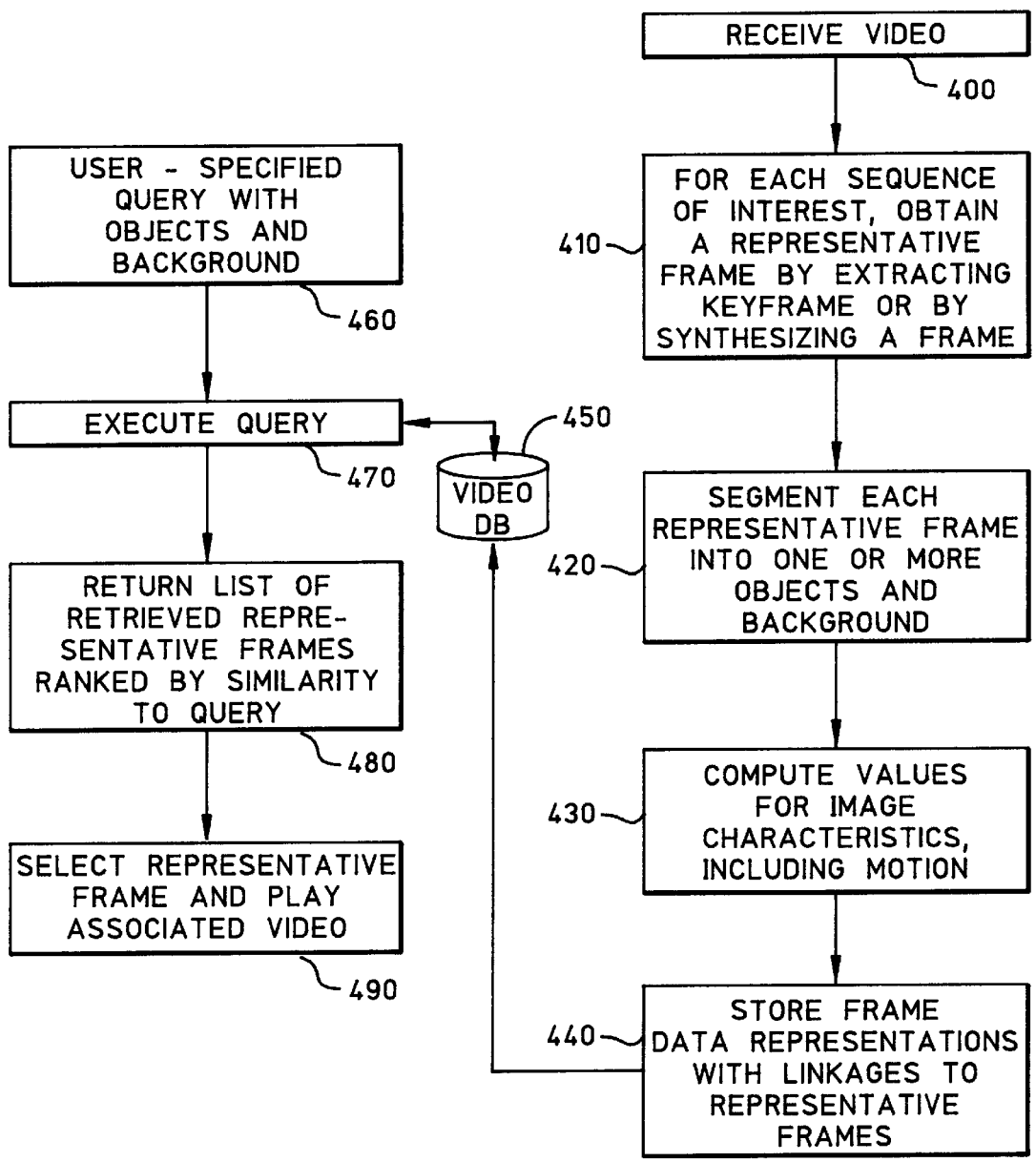
FIG. 16 illustrates the method of the invention.

FIGS. 15 and 16 illustrate concepts and processes of this invention. The invention may be practiced in the previously-described and illustrated QBIC systems. In FIG. 15, video information is represented in a sequence 310 of still images, each still image contained within a standard border such that the border and the still image comprise a frame. The video information in the sequence 310 is provided when the sequence is shown, one frame at a time, at a predetermined speed to give the illusion of motion. In the sequence 310, there are illustrated four frames 312, 313, 314 and 315. Each of the frames contains an image comprising a stick figure 316, a tree 317. a bird 318, and a horizon 319 dividing sky 320 from earth 321. When the frames are displayed in the sequence 312, 313, 314, 315, the bird 318 flies to the tree 317, while the stick figure 316 advances to the tree. The sequence of contiguous frames 312, 313, 314, and 315 may be processed for storage in an image database whence it and other sequences may be retrieved in response to a query. In this regard, the visual information in the sequence 312, 313, 314, 315 may be represented by a single representative frame 330. The representative frame 330 may be a key frame—one of the frames from the sequence chosen for its location, composition, and other, related factors. Or, the representative frame 330 may comprise a synthesized frame that is made by integrating some or all of the images in the sequence. Assuming that the representative frame 330 is a synthesized frame, the bird 318 and the stick figure 316 may be accompanied by motion vectors 318a and 316a, respectively, representing their motion in the sequence. However, assuming that the tree, horizon, sky, earth components of the sequence exhibit little or no motion, they are unaccompanied by motion vectors in the representative frame 330.

The representative frame 330 is segmented, using standard segmentation techniques, into at least two classes of image components: objects and background. Objects may be defined using known means and criteria. For example, motion against a static (or slowly moving) background through a sequence may define an object, in which case the bird 318 and its associated motion vector 318a, and the stick figure 316 and its associated motion vector 316a would be classified as objects in the frame 330. The features remaining in the frame when the objects have been segmented therefrom may be classed as background, which is represented by reference numeral 314 in FIG. 15. The background of the sequence 310 therefore comprises the tree 317, the horizon 319, the sky 320, and the earth 321.

When the frame 330 has been decomposed into segments including objects and background, numeric values are computed for the image characteristics of all of the segments. In this regard, image characteristics may include color, texture, shape and size. In addition, image characteristics necessary to define motion are computed, such as the centroid of an object and its motion vector. It is important to note that the background may also move in a sequence and therefore may have motion characteristics, in addition to the standard image characteristics. Following calculation of image characteristic values, a frame data representation 350 of the frame 330 is constructed and stored. Relatedly, the frame data representation could have any data structure form that is convenient for storage and fast access including, but not limited to a table, a linked list, a tree, or any equivalent. For illustration only, FIG. 15 illustrates a table 351 that contains identification of the segments of the frame 330, including one or more objects $O_1$ . . . , and a background B, associated with which are calculated values for image characteristics.

The set of image characteristics for which values are computed may be established when a system is initialized. The set, of course, would reflect the purpose for which the system is designed, and can be amended during the lifetime of the system.

The synthesis of representative frames for shots is described, for example, in H. Sawhney, et al., "*Model-based 2D & 3D Dominant Motion Estimation for Mosaicing and Video Representation*", published online at ftp// eagle.almaden.ibm.com, beginning January 1995. Sequence definition, synthesis of representative frames, calculation of image characteristic values, and storage of video data are described in E. Ardizzone, et al., "*Automatic Video Database Indexing and Retrieval*", MULTIMEDIA TOOLS AND APPLICATIONS 4, pp. 29–56 (1997). Segmentation is disclosed in M. Flickner, et al., op.cit.

Storage of frame data for fast, efficient access and retrieval in response to a query presumes decomposition of the frame into a representative data structure, such as the image data representation 42 in FIG. 2, or the frame data representation 350 in FIG. 15, and storage of the represented frame and the data representation, with association such as a linkage or a pointer from the frame data representation to the stored frame. The frame data representation is stored with frame data representations of other frames and it is these structures that are searched in response to a query. It is contemplated that video and individual still images could be stored in the same database, or in linked databases, accessed by one or more database systems. For still images, it is sufficient to store only the image and its associated image data representation. For video, the invention contemplates storage of one or more video programs, and indexing to each video program through one or more video sequences in the program. For each of one or more video sequences, the invention contemplates storage of at least a frame data representation, an associated repesentative frame, and the sequence represented by the frame. Thus, when frame data representations are processed in response to a query, the results are returned in the form of a set of frames, ranked in order of similarity to the query. In order to view a sequence of frames represented by any one of the frames in a result set, the user moves a cursor to the frame in the result set, clicks on it, and the corresponding frame sequence is retrieved and displayed. Therefore, in FIG. 15, there is illustrated a linkage 353 between the frame data representation 350 and the representative frame 330, and a linkage 354 between the frame 330 and the sequence 310.

FIG. 16 is a flow chart illustrating a method for practicing the invention. The method has two phases: indexing and query. In the index phase, in step 400 a video program is received from any conventional source. In step 410 the received video program is partitioned into one or more sequences. A sequence may be represented in step 410 by one or more single frames of the sequence (a kly frame) and/or by a sequence of frames. If the sequence representation is indicated, the sequence of frames may be processed into one or more representative frames. In any event, at least one representative frame is the result of step 410. The at least one representative frame is segmented in step 420 into one or more objects and background. In step 430, values for the image characteristics of the one or more objects and the background are computed. Such image characteristics include, without limitation, color, texture, shape, centroid, and motion for each object and the background. The computed characteristics are assembled in step 440 into a frame data representation which is stored, with a linkage to the at least one representative frame, in step 440. The storage medium in which a database including video ("video database") is stored is indicated by reference numeral 450.

In the query phase, in step 460, a user-specified video query in the form of a search image with objects and background is received by a database system in step 460. The search image may comprise thumbnails, sketches, or an image. As disclosed above, similarity parameters such as location, distance, and weight can be specified for the image characteristic value of the query. In addition, in this invention, the query would include specification of an object with a set of image characteristics that may include motion, and associated values, and a background with a set of image characteristics that may include motion, and associated values. The query is executed at step 470 and a list of retrieved representative frames is returned in step 480, ranked by similarity to the search image. In step 490, a frame in the list returned in step 480 is selected and the represented video is displayed for the user.

A representative query as compiled and executed by the QBIC engine of FIG. 1 may have the form:

```
QUERY
    OBJECT₁
        (COLOR₁(value, distance, weight)) . . .
        (TEXTURE(value, distance, weight)) . . .
        (SHAPE(value, distance, weight))
        (CENTROID(value, distance, weight))
        (MOTION(value, distance, weight))
    OBJECT₂ . . .
        .
        .
        .
    BACKGROUND    . . .
        .
        .
        .
```

Of course, the database 450 can be searched by a query that in the form of a still image, or a representative frame.

Accordingly, the invention would support a query such as: "Find video sequences in which a brown bird object moves from location$_i$ to location$_j$ across a background containing a horizon and a tree, such that the bird object stays above the horizon".

In the view of the above description, it is likely that modifications and improvements will occur to those skilled in the art which are within the scope of the accompanying claims.

We claim:

1. A method for retrieving video sequences from a database that contains representative frames, each representative frame representing video information, the method comprising:

receiving a search image and segmenting the search image into segments that include at least one object and a background;

executing a query of the database by determining whether a representative frame in the database that has at least one object and a background that is similar to the search image; and returning a set of representative frames ranked in an order according to a degree of similarity to the search image.

2. The method of claim 1, wherein the search image specifies values for a plurality of image characteristics for the at least one object and the background.

3. The method of claim 2, wherein at least one image characteristic is motion.

4. The method of claim 2, wherein the plurality of image characteristics includes color, texture, and motion.

5. The method of claim 1, further including:

selecting a representative frame of the set of representative frames;

retrieving the video sequence that is represented by the representative frame from the database; and displaying the video sequence.

6. The method of claim 5, wherein the representative frame is a key frame.

7. The method of claim 6, wherein the representative frame is a synthesized frame.

8. A method of storing video information in a database, comprising:

receiving a video sequence comprising a plurality of frames;

providing a representative frame representing the video sequence;

segmenting the representative frame into a plurality of segments that include at least one object and a background;

constructing a frame data representation of the representative frame that includes respective data representations of the at least one object and the background; and storing the frame data representation in the database.

9. The method of claim 8, further including:

associating the frame data representation with the representative frame; and storing the representative frame in the database.

10. The method of claim 9, further including:

associating the representative frame with the video sequence; and storing the video sequence in the database.

11. The method of claim 8, wherein constructing includes computing values of the image characteristics of the object and the background, the respective data representations including the values.

12. The method of claim 11, wherein the image characteristics include motion.

13. The method of claim 11, wherein the image characteristics include color, texture, and motion.

14. The method of claim 8, wherein the representative frame is a key frame.

15. The method of claim 8, wherein the representative frame is a synthesized frame.

* * * * *